US008662570B2

(12) United States Patent
Guenther et al.

(10) Patent No.: US 8,662,570 B2
(45) Date of Patent: Mar. 4, 2014

(54) RADIATOR GRILLE FOR A MOTOR VEHICLE

(75) Inventors: Alexander Guenther, Lorch (DE); Hans-Hermann Otte, Varel (DE)

(73) Assignee: Daimler AG, Stuttgart (DE)

(*) Notice: Subject to any disclaimer, the term of this patent is extended or adjusted under 35 U.S.C. 154(b) by 0 days.

(21) Appl. No.: 13/811,506

(22) PCT Filed: Jul. 15, 2011

(86) PCT No.: PCT/EP2011/003543
§ 371 (c)(1),
(2), (4) Date: Jan. 22, 2013

(87) PCT Pub. No.: WO2012/010279
PCT Pub. Date: Jan. 26, 2012

(65) Prior Publication Data
US 2013/0119709 A1 May 16, 2013

(30) Foreign Application Priority Data
Jul. 23, 2010 (DE) .......................... 10 2010 032 085

(51) Int. Cl.
*B60R 19/52* (2006.01)
(52) U.S. Cl.
USPC ....................................... 296/193.1; 293/115
(58) Field of Classification Search
USPC ........... 180/68.1, 68.6; 123/41.05; 296/193.1; 293/115
See application file for complete search history.

(56) References Cited

U.S. PATENT DOCUMENTS

| 7,498,926 B2* | 3/2009 | Browne et al. ............. 340/425.5 |
| 2006/0060401 A1* | 3/2006 | Bole ............................ 180/68.1 |

FOREIGN PATENT DOCUMENTS

| DE | 39 16 907 A1 | 12/1989 |
| DE | 103 06 158 A1 | 8/2004 |
| FR | 2 404 557 A1 | 4/1979 |
| FR | 2 939 371 A1 | 6/2010 |

OTHER PUBLICATIONS

International Search Report with English translation dated Jan. 20, 2012 (four (4) pages).
German-language Written Opinion (PCT/ISA/237) (six (6) pages).

* cited by examiner

*Primary Examiner* — Joseph Pape
*Assistant Examiner* — Dana Ivey
(74) *Attorney, Agent, or Firm* — Crowell & Moring LLP

(57) ABSTRACT

A radiator grille for a motor vehicle includes a basic support with a region for a marquee badge having an external contour that is, at least in regions, curved or oblique. A number of fins are held on the basic support, the number of fins are movable out of a closed position closing respective passage openings in the radiator grille into an open position uncovering the passage openings. In this case, at least one of the fins is displaceable in the direction of its longitudinal extent by bringing it from the closed position into the open position.

8 Claims, 1 Drawing Sheet

RADIATOR GRILLE FOR A MOTOR VEHICLE

BACKGROUND AND SUMMARY OF THE INVENTION

Figure 1:
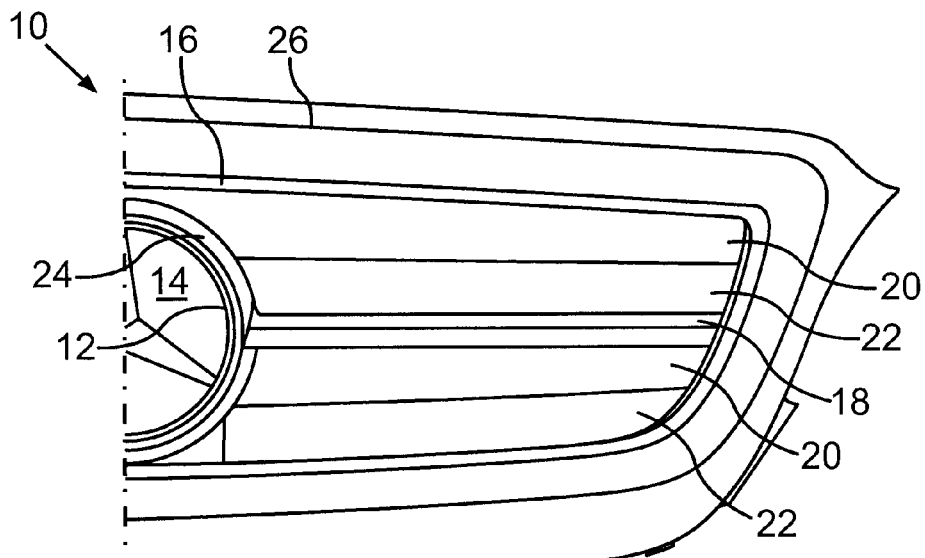

Exemplary embodiments of the present invention relate to a radiator grille for a motor vehicle, with a basic support and with a plurality of fins held on the basic support. The fins are movable out of a closed position that closes respective passage openings in the radiator grille into an open position which uncovers the passage openings.

Conventional radiator grilles of this type are disadvantageously subjected to restrictions with regard to the configuration of the passage openings.

German Patent Document DE 39 16 907 A1 describes a radiator grille having a plurality of fins that are pivotable about axes extending in the transverse direction of the vehicle. The fins are coupled together such that all the fins can be pivoted about their axes simultaneously by means of a motor by moving a single push rod. In the closed position, the fins prevent the supply of cooling air to a radiator located behind the radiator grille in the direction of travel of the motor vehicle.

Exemplary embodiments of the present invention are directed to a radiator grille with particularly great flexibility with regard to the configuration of the passage openings.

The radiator grille for a motor vehicle according to exemplary embodiments of the present invention comprises a basic support and a plurality of fins held at least indirectly on the basic support, which fins are movable out of a closed position that closes respective passage openings in the radiator grille into an open position that uncovers the passage openings. In this case, at least one of the fins is displaceable in the direction of its longitudinal extent by bringing it from the closed position into the open position. This means that the at least one fin in the closed position can close a passage opening that has an oblique or curved edge, the at least one fin in the closed position being in contact with this edge. By being brought into the open position, on the other hand, the at least one fin can completely uncover the passage opening. Upon opening the at least one fin, this fin is therefore at the same time displaced laterally in one direction, and upon closing is moved back into the opposite direction, in order then to come into contact again with the oblique or curved edge of the passage opening.

Such kinematics of the at least one fin are advantageous in particular when the basic support has a region for a marquee badge with an external contour which is curved or oblique at least in regions. For then in the closed position the fin can adjoin directly the region for the, in particular round, marquee badge, and in the open position can close the passage opening that extends as far as the external contour of the marquee badge.

Because the fins that can brought from the closed position into the open position are displaceable in the direction of their longitudinal extent it possible to close passage openings with many different shapes and to uncover them in the open position of the fins. This means that the radiator grille has great flexibility with regard to the configuration of the passage openings.

In an advantageous configuration of the invention, two fins are provided for closing and uncovering a corresponding passage opening. For in the open position, in which a narrow side of the fins faces an air stream that passes through the passage opening in the radiator grille, two fins take up a smaller amount of space than if merely one fin were provided for closing and uncovering one and the same corresponding passage opening. Thus, a comparatively large passage opening can be provided for a low overall depth of the radiator grille.

It has proved advantageous here if, by the movement of a first of the two fins about an axis of rotation, the second of the two fins is movable by positive control about the same axis of rotation. Then merely one actuating element needs to be provided in order to move both fins simultaneously about the axis of rotation.

It is furthermore advantageous if, by bringing a first of the two fins from the closed position into the open position, the second of the two fins is displaceable further in the direction of the longitudinal extent than the first fin. This means that, even with a passage opening having an oblique or curved edge extending over a comparatively great length, it is possible to bring the two fins into contact with this edge in their respective closed positions. In the open position both fins also uncover that region of the passage opening having the oblique or curved edge.

The two fins can be accommodated in a particularly space-saving manner if, in the open position, they are in contact with each other, overlapping each other at least in regions.

In a further advantageous embodiment of the invention, the radiator grille, for bringing the at least one fin from the closed position into the open position, has a fin support that is held on the basic support of the radiator grille pivotably about an axis of rotation that coincides with the direction of longitudinal extent of the at least one fin. Accordingly, the pivoting of the fin support about the axis of rotation ensures that the at least one fin is moved from a closed position that shields the air stream through the passage opening into the open position in which the air stream strikes a narrow side of the at least one fin.

The features and combinations of features named above in the description and the features and combinations of features named below in the description of the figures and/or shown in the figures alone can be used not only in the combination specified in each case, but also in other combinations or on their own, without departing from the scope of the invention.

BRIEF DESCRIPTION OF THE DRAWING FIGURES

Figure 2:
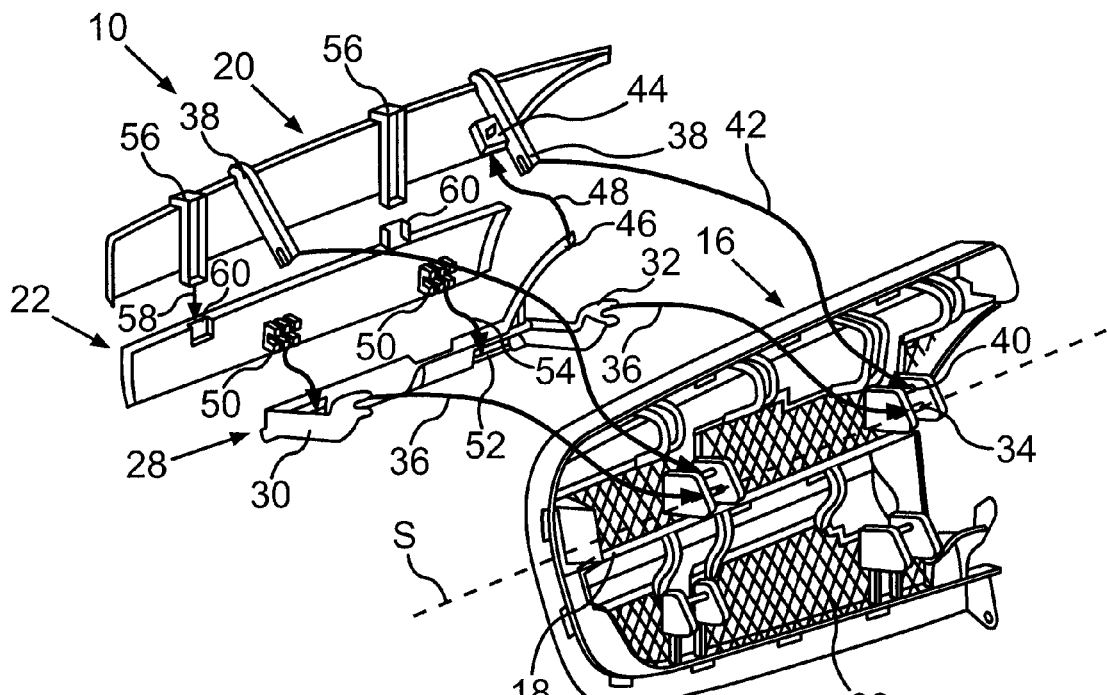

Further advantages, features and details of the invention will become apparent from the claims, the following description of preferred embodiments, and with reference to the drawings. Therein:

FIG. 1 shows in part a radiator grille with a centrally arranged round marquee badge, in which passage openings through the radiator grille are closed in each case by means of two fins; and FIG. 2 shows in an exploded view component parts of the radiator grille according to FIG. 1 in a rearward view.

DETAILED DESCRIPTION

FIG. 1 shows, in part and in a front view, a radiator grille 10 for a motor vehicle, in which a round marquee badge 12 is arranged centrally in a likewise round recess 14 in a basic support 16. In the basic support 16, two passage openings of the radiator grille 10 are delimited from one another by a rigid, non-movable visible fin 18. The two passage openings can be closed by means of two fins 20, 22 in each case, which in FIG. 1 are shown in their closed position which closes the passage openings. In the direction of the recess 14 for the marquee badge 12, the passage openings extend as far as an edge 24 of the basic support 16, which defines the recess 14. The fins 20, 22 in their closed position are in contact with the edge 24. The basic support 16 is surrounded by a frame-like trim part 26 on the external periphery.

FIG. 2 shows individual component parts of the radiator grille 10, namely the upper fin 20 and the lower fin 22, and a fin support 28 via which the fins 20, 22 can be fixed to the basic support 16.

The fin support 28 has two arms 30, on the ends of which respective latch joints 32 are formed. The two latch joints 32 in the assembled state of the radiator grille 10 are latched to corresponding pivot bearings 34 provided on the basic support 16. Arrows 36 in FIG. 2 illustrate how the latch joints 32 are attached to the two corresponding pivot bearings 34. The two pivot bearings 34 form an axis of rotation S coinciding with a direction of longitudinal extent of the two fins 20, 22.

On the upper fin 20, likewise two arms 38 are provided, on each of the ends of which a groove is provided. When the fin support 28 is fixed to the basic support 16, the grooves of the arms 38 of the upper fin 20 engage around respective pivot sliding bearings 40, which are likewise provided on the basic support 16. Arrows 42 in FIG. 2 illustrate the attachment of the arms 38 of the upper fin 20 to the two pivot sliding bearings 40. The pivot sliding bearings 40 are arranged eccentrically with regard to the axis of rotation S.

On the right hand one of the two arms 38, there is arranged a control link 44 in which a control pin 46 provided on the fin support 28 engages if the upper fin 20 is fastened to the fin support 28. A corresponding arrow 48 illustrates the threading-in of the control pin 46 into the control link 44 of the upper fin 20 which is formed in the manner of a frame. The shaping of the control pin 46 means that upon pivoting the fin support 28 about the axis of rotation S the upper fin 20 is displaced laterally in the direction of the axis of rotation S. In such case, the grooves provided on the arms 38 slide along the pivot sliding bearings 40.

The lower fin 22 can likewise be fixed by means of two latch elements 50 to corresponding pivot sliding bearings 52, which are provided on the fin support 28. Corresponding arrows 54 in FIG. 2 illustrate the attachment of the latch elements 50 to the two pivot sliding bearings 52.

The lower fin 22 is likewise displaceable in the direction of the axis of rotation S by the pivoting of the fin support 28 about the axis of rotation S, namely relative to the upper fin 20. For this, two guide tabs 56 are provided on the upper fin 20 which—corresponding to the arrows 58 shown in FIG. 2—are introduced into two guide grooves 60 which are provided on the lower fin 22.

If the two fins 20, 22 are fastened to the fin support 28, upon pivoting the fin support 28 about its axis of rotation S—and accompanied by this upon bringing both fins 20, 22 into their open position—the lower fin 22 is pushed under the upper fin 20. In the open position, both fins 20, 22 then overlap such that their lower narrow side faces an air stream which strikes frontally the radiator grille 10.

Due to the fact that the two fins 20, 22 in the open position are arranged stacked one above the other on the basic support 16, the latter has only a low depth and hence a low space requirement in the longitudinal direction of the vehicle. Nevertheless, a comparatively large passage opening in each case in the radiator grille 10 can be closed or uncovered by the two fins 20, 22. In the region of the passage openings, in the present case grids 62 are provided on the basic support 16, which grids, when the fins 20, 22 are brought into their open position, act as screens which retain coarse matter.

Upon pivoting the fin support 28 out of a position in which the fins 20, 22 are brought into their closed position, and thus the arms 30 point downwards, into an end position in which the two arms 30 point upwards, the two fins 20, 22 are simultaneously pushed together, perform a rotary movement on a circular path with the axis of rotation S as centre point and at the same time are laterally deflected. This forced guidance of the fins 20, 22 in a combined rotary, pivoting and sliding movement makes it possible for the fins 20, 22 to surround externally on the periphery the round marquee badge 12 which is in the middle of the radiator grille 10 in the closed position, these fins in their open position uncovering large passage openings in the radiator grille 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A radiator grille for a motor vehicle, comprising:
   a basic support having a region with a curved or oblique edge;
   a plurality of fins held on the basic support, wherein the plurality of fins are configured to be movable out of a closed position closing respective passage openings in the radiator grille into an open position uncovering the passage openings, wherein the plurality of fins each have a longitudinal extent in a horizontal direction, and wherein the plurality of fins includes two fins;
   at least one guide tab arranged on a first of the two fins, the at least one guide tab is engaged with a guide groove provided on a second of the two fins,
   wherein at least one of the plurality of fins is configured to be displaceable in a direction of the longitudinal extent of the at least one of the plurality of fins when the at least one of the plurality of fins is moved from the closed position into the open position.

2. The radiator grille as claimed in claim 1, wherein movement of the first of the two fins about an axis of rotation causes the second of the two fins to move about the same axis of rotation.

3. The radiator grille as claimed in claim 1, wherein by bringing a first of the two fins from the closed position into the open position, the first of the two fins is displaced a certain distance in the direction of the longitudinal extent and the second of the two fins is displaceable further in the direction of the longitudinal extent than the certain distance.

4. The radiator grille as claimed in claim 1, wherein in the open position the two fins are in contact with each other and partially overlap each other.

5. The radiator grille as claimed in claim 1, further comprising:
   a fin support configured to bring the at least one of the plurality of fins from the closed position into the open position, the fin support being held on the basic support of the radiator grille pivotably about an axis of rotation coinciding with the direction of the longitudinal extent of the at least one of the plurality of fins.

6. The radiator grille as claimed in claim 5, further comprising:
   at least one pivot sliding bearing, attached to the basic support eccentrically to the axis of rotation, for the at least one of the plurality of fins.

7. The radiator grille as claimed in claim 5, further comprising:

a control pin provided on the fin support, the control pin being engaged with a control link provided on the at least one of the plurality of fins.

8. The radiator grille as claimed in claim 5, further comprising:
at least one pivot sliding bearing provided on the fin support, wherein the second of the two fins is held on the at least one pivot bearing.

\* \* \* \* \*